United States Patent
Miano et al.

(10) Patent No.: US 12,522,290 B2
(45) Date of Patent: Jan. 13, 2026

(54) METHOD FOR CONTROLLING A STEER-BY-WIRE STEERING SYSTEM, CONTROL DEVICE AND MOTOR VEHICLE

(71) Applicants: thyssenkrupp Presta AG, Eschen (LI); thyssenkrupp AG, Essen (DE)

(72) Inventors: Carlo Mario Miano, Triesenberg (LI); Leonard Lapis, Sennwald (CH); Kristof Polmans, Tarrenz (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 35 days.

(21) Appl. No.: 18/790,844

(22) Filed: Jul. 31, 2024

(65) Prior Publication Data
US 2025/0042470 A1  Feb. 6, 2025

(30) Foreign Application Priority Data
Aug. 2, 2023 (BE) .................................. 2023/5644

(51) Int. Cl.
*B62D 7/00* (2006.01)
*B62D 7/15* (2006.01)
(Continued)

(52) U.S. Cl.
CPC ............. *B62D 7/159* (2013.01); *B62D 9/002* (2013.01); *B62D 5/0484* (2013.01)

(58) Field of Classification Search
CPC ........ B62D 7/159; B62D 9/002; B62D 9/005; B62D 5/0484; B62D 6/003; B62D 5/003
See application file for complete search history.

(56) References Cited

U.S. PATENT DOCUMENTS 6,481,524 B1 * 11/2002 Ishida ..................... B62D 15/02
                                                                    180/252
6,863,356 B2    3/2005 Hackl et al.
(Continued)

FOREIGN PATENT DOCUMENTS

CN          114919640 A     8/2022
DE    10 2004 034 126 A1    2/2006
(Continued)

*Primary Examiner* — Phutthiwat Wongwian
*Assistant Examiner* — Sherman D Manley
(74) *Attorney, Agent, or Firm* — thyssenkrupp North America, LLC

(57) ABSTRACT

A method for controlling a steer-by-wire steering system for a motor vehicle having steerable front and rear wheels in emergency steering operation comprises checking the steering system for the presence of a fault state and performing the emergency steering operation to maintain original driving behaviour if a fault state is detected, including: determining a target lateral acceleration on the basis of a current steering wheel position and a current vehicle speed, determining a yaw moment and, from the yaw moment, a general wheel steering angle for the original driving behaviour, where the general wheel steering angle is equal to a difference between a front wheel steering angle and a rear wheel steering angle, determining a front wheel steering angle correction and a rear wheel steering angle correction, and determining drive torques and/or braking torques for the front wheels and the rear wheels, which are distributed appropriately by the torque vectoring system.

9 Claims, 1 Drawing Sheet

(51) Int. Cl.
  *B62D 9/00*  (2006.01)
  *B62D 5/04*  (2006.01)

(56) References Cited

U.S. PATENT DOCUMENTS

| | | | | |
|---|---|---|---|---|
| 8,534,414 | B2* | 9/2013 | Williams | B62D 5/003 |
| | | | | 180/402 |
| 8,886,412 | B2* | 11/2014 | Rosol | B62D 5/003 |
| | | | | 701/41 |
| 10,899,340 | B1 | 1/2021 | Hitzinger | |
| 11,697,456 | B2* | 7/2023 | Lapis | B62D 9/002 |
| | | | | 701/69 |
| 2007/0144818 | A1* | 6/2007 | Sherwin | B62D 5/04 |
| | | | | 180/411 |
| 2014/0277893 | A1* | 9/2014 | Rosol | B62D 6/00 |
| | | | | 701/23 |
| 2018/0354551 | A1* | 12/2018 | Blond | B62D 5/30 |
| 2020/0039580 | A1* | 2/2020 | Redeker | B62D 7/148 |
| 2023/0001929 | A1 | 1/2023 | Lapis et al. | |
| 2023/0121593 | A1 | 4/2023 | Labarbera et al. | |
| 2023/0227102 | A1 | 7/2023 | Kim | |

FOREIGN PATENT DOCUMENTS

| | | |
|---|---|---|
| DE | 10 2015 009 241 A1 | 1/2017 |
| DE | 102019129032 A1 | 4/2021 |
| DE | 10 2020 100 719 A1 | 7/2021 |
| DE | 102020101587 A1 | 7/2021 |
| DE | 10 2022 106 530 B3 | 5/2023 |
| EP | 1 351 843 B1 | 10/2003 |
| EP | 4 093 650 A1 | 11/2022 |
| KR | 101349467 B1 | 1/2014 |

* cited by examiner

METHOD FOR CONTROLLING A STEER-BY-WIRE STEERING SYSTEM, CONTROL DEVICE AND MOTOR VEHICLE

CROSS REFERENCE TO RELATED APPLICATION

This application is a U.S. Non-Provisional that claims priority to Belgian Patent Application No. BE 2023/5644, filed Aug. 2, 2023, the entire content of which is incorporated herein by reference.

FIELD

The present disclosure relates to a method for controlling a steer-by-wire steering system, a control device and a motor vehicle.

BACKGROUND

In a steer-by-wire steering system, the steered wheels and the steering wheel are not coupled mechanically but electrically. The steered wheels are controlled by steering signals. The respective steering wheel position is detected by a steering angle sensor. The effect of the corresponding steering signal is that a steering actuator changes the position of the steered wheels.

In normal operation, the proper function of the steer-by-wire steering system is checked continuously. In the event of a fault, the steer-by-wire steering system is switched off and an emergency steering system is activated in order to maintain the steering function of the vehicle. To this end, mechanical auxiliary systems which permit the emergency steering operation can be provided. The advantages of the steer-by-wire steering system with regard to overall space, mounting, left-hand and right-hand steering variants and crash response are, however, virtually cancelled or at least impaired as a result.

A completely electrically operating emergency steering system is known from DE 10 2019 129 032 A1, which originates from the applicant and differs from mechanical auxiliary systems by the use of a torque vectoring system, so that it is possible to dispense with a mechanical connection between the steering wheel and steered wheels. Even though the known system already functions very well, there is scope for improvement with regard to the most accurate possible reproduction of the original driving behaviour when the emergency steering system is activated.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
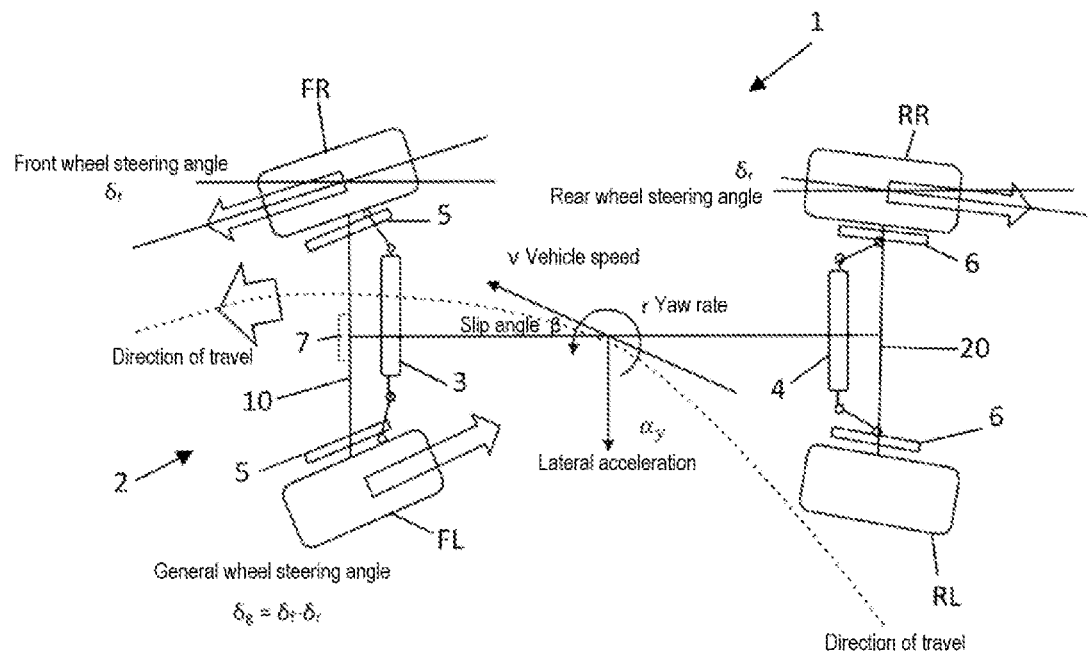
FIG. 1 shows a vehicle having a steerable front axle and a steerable rear axle, in which an exemplary embodiment according to the invention of the method for controlling the steer-by-wire steering system is implemented.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Some embodiments improve the method known from the prior art mentioned at the beginning to the effect that, without the use of mechanical aids for coupling the steering wheel and the steered wheels, the original driving behaviour is reproduced as accurately as possible in emergency steering operation. Some embodiments also specify a corresponding control device and a motor vehicle.

Some embodiments include a method for controlling a steer-by-wire steering system for a motor vehicle in emergency steering operation, wherein the motor vehicle comprises a front axle with front wheels, a rear axle with rear wheels, a steer-by-wire steering system and a torque vectoring system. The front wheels and the rear wheels are each connected by a steering rod and are steerable. The method comprises the following steps:

checking the steering system for the presence of a fault state, performing the emergency steering operation to maintain the original driving behaviour if a fault state is detected, wherein the following steps are carried out in emergency steering operation:

determining the target lateral acceleration on the basis of the current steering wheel position and the current vehicle speed, determining the yaw moment and, from this, a general wheel steering angle δg for the original driving behaviour, wherein, for the general wheel steering angle δg $$\delta g = \delta f - \delta r$$

δg—general wheel steering angle
δf—front wheel steering angle
δr—rear wheel steering angle determining a front wheel steering angle correction Δδf and a rear wheel steering angle correction Δδr and determining the drive torques and/or braking torques for the front wheels and the rear wheels, which are distributed appropriately by the torque vectoring system.

The method according to the invention has the advantage that the functionality of the vehicle with regard to the steering behaviour is reproduced completely, for example in the event of a failure of the steering actuator or the actuator unit for transmitting the steering movement to the steered wheels. Even in the non-linear operating region of the vehicle, the yaw rate response and the slip angle response are reproduced in the emergency steering operation, so that the original direction of travel is maintained precisely. To this end, provision is made for the rear wheels to be steerable in addition to the front wheels. Within the context of the method, the general wheel steering angle is determined as a function of the front wheel steering angle and the rear wheel steering angle on the basis of the yaw moment. For the setting of the desired front wheel steering angle and the desired rear wheel steering angle, the drive torques and/or braking torques are distributed by the torque vectoring system to the corresponding front wheels and rear wheels. The steering actuator or other mechanical auxiliary systems are thus not required in emergency steering operation, so that the steering function of the vehicle is maintained completely electrically. The steering rods between the front and rear wheels are each moved into the desired steering position by the distribution of torque to the individual wheels.

The inclusion of the rear wheel steering in the emergency case operation leads to an additional degree of freedom, by which the original driving behaviour is reproduced particularly precisely.

The advantages cited in connection with the method also apply in a corresponding way to the control device according to the invention. The method steps described in connection with the method are also disclosed in connection with the control device, specifically in the form in which the control device is configured or adapted to perform these method steps.

The original direction of travel and original driving behaviour are understood to be the direction of travel and the driving behaviour in normal operation, respectively. The emergency steering operation can be triggered by different faults, for example by a failure of the steering actuator which drives the steering rod between the front wheels, or by an electronic fault of the steer-by-wire steering system. In any case, as a result of the fault state, the original driving behaviour in normal operation cannot be maintained. The lateral acceleration of the vehicle is the acceleration acting at right angles to the vehicle longitudinal axis. The yaw moment is the moment acting around the vertical axis of the vehicle. The general wheel steering angle corresponds to the difference between the front wheel steering angle and the rear wheel steering angle. The front wheel steering angle is the angle between a radial plane of the front wheel at right angles to the axis of rotation of the wheel and a parallel to the vehicle longitudinal axis. The same is correspondingly true of the rear wheel. The front wheel steering angle correction or rear wheel steering angle correction is the control variable to reach the intended general wheel steering angle and leads to a corresponding movement of the respective steering rod.

The slip angle is the angle between the direction of movement of the vehicle and the vehicle longitudinal axis. The approximate determination of the slip angle is generally known and will not be explored further.

The term control is not understood in the strict control sense but also comprises closed-loop control. The invention therefore also relates to a method for the closed-loop control of a steer-by-wire steering system and a corresponding control device.

The torque vectoring system effects the distribution of torque to individual wheels, so that the front wheels and the rear wheels, i.e. the respective left-hand and right-hand wheel, each have different torques applied. As a result, the yaw angle or the yaw rate is influenced in a manner known per se. The torques are drive torques and/or braking torques.

Thus, the method can comprise the step: determining a target slip angle $\beta$ as a target variable for the front wheel steering angle $\delta f$ and the rear wheel steering angle $\delta r$. This has the advantage that the original direction of travel of the vehicle is maintained precisely.

The method preferably comprises the following step: determining the yaw moment components from the yaw moment for the drive torques and/or braking torques for the front wheels and the rear wheels, which are distributed appropriately by the torque vectoring system. The current yaw moment is thus mapped precisely by the torque vectoring system and distributed to the rear wheel steering and the front wheel steering.

The method can comprise the step: determining the yaw moment on the basis of the current steering wheel position and the current vehicle speed. The yaw moment can be calculated in a manner known per se.

Preferably, the steer-by-wire steering system has front wheel steering. This has the advantage that the invention can be applied to standard steering systems. Front wheel steering is understood to be wheel steering in which the front wheels are steered actively, i.e. by using a driven steering rod. The front wheel steering comprises a steering actuator or a corresponding actuator unit which is coupled to the steering rod. If the steering actuator or the actuator unit fails, the steering rod between the front wheels is not blocked but can move freely, so that the position of the steering rod is determined by the torque distribution between the right-hand and left-hand front wheel.

The rear wheel steering is preferably drive-free. The steering rod of the rear wheel steering is not driven but is moved exclusively by the torque distribution between the left-hand and the right-hand rear wheel.

The motor vehicle preferably has individual wheel brakes. Therefore, a torque distribution can be achieved by different braking torques or brake pressures on the individual left-hand and right-hand wheels. Therefore, even in the case of non-driven axles, for example the rear axle, torque vectoring is possible. Individual wheel brakes can also be provided on the wheels of the driven axles, for example the front axle, so that, in addition to the drive torques, in particular the wheel-individual drive torques, individual braking torques can act on the individual wheels. An individual wheel brake is understood to be a brake which introduces a wheel-individual braking torque into the respective wheel, the wheel-individual braking torque being independent of the braking torque of the other wheel of the same axle.

The motor vehicle can have a drive which is arranged on the front axle and has an open differential gear mechanism. This is preferably a single central drive. The invention can therefore be applied to the usual drive designs. An open differential gear mechanism is not equipped with a locking device.

FIG. 1 shows in plan view and as an abstraction the chassis of a motor vehicle 1, in particular a passenger vehicle, in which an exemplary embodiment according to the invention of the method for controlling a steer-by-wire steering system 2 is implemented. The vehicle has an appropriate control device (not shown), which is configured to perform the method.

The motor vehicle 1 has a front axle 10 with a left-hand front wheel FL and a right-hand front wheel FR, and a rear axle 20 with a left-hand rear wheel RL and a right-hand rear wheel RR. The two front wheels FL, FR are connected mechanically by a first steering rod 3, and the two rear wheels RL, RR are connected mechanically by a second steering rod 4. Both the front wheels FL, FR and the rear wheels RL, RR are steerable. For this purpose, the respective steering rod 3, 4 is moved to the right or left in a known manner. For the front wheel steering, a steering actuator or an actuator unit (not illustrated) is provided, which is connected mechanically to the first steering rod 3 and which provides the driving force required for the steering. The steering actuator is controlled electronically within the context of the steer-by-wire steering system and is not connected mechanically to the steering wheel. The control signal is received by the steering actuator from a steering angle sensor, which outputs a steering signal corresponding to the respective steering wheel position.

The motor vehicle 1 is equipped with a torque vectoring system, which supplies the driven wheels individually with a drive torque. In the example according to FIG. 1, the front wheels FL, FR are driven. The vehicle engine is arranged on the front axle 10 and connected to an open differential gear mechanism. The rear axle 20 is not driven.

The rear axle 20 comprises individual wheel brakes 6 which, within the context of the torque vectoring system, introduce wheel-individual braking torques or brake pressures into the left-hand rear wheel RL and the right-hand rear wheel RR, respectively. In the example according to FIG. 1, the two front wheels FL, FR also have individual wheel brakes 5. Therefore, individual braking torques can be applied to the two front wheels FL, FR in addition to the individual drive torques.

With reference to FIG. 1, the parameters essential to the method are explained in more detail. As can be seen in FIG. 1, the lateral acceleration ay acts at right angles to the longitudinal axis of the vehicle. The yaw moment and the yaw rate act about the vertical axis of the vehicle. The vehicle speed v is determined or measured at a tangent to the direction of travel. In the example according to FIG. 1, for example, the direction of travel extends in the form of a left-hand curve in the operating state shown there.

The slip angle β is the angle between the direction of travel of the vehicle and the vehicle longitudinal axis. In the example according to FIG. 1, the slip angle β is determined or estimated in a manner known per se in the area of the vehicle centre of gravity. The yaw moment and the lateral acceleration are likewise detected in the area of the vehicle centre of gravity. In general, the yaw moment and the lateral acceleration and also the slip angle β will be detected at the same position on the vehicle longitudinal axis.

As shown in FIG. 1, the front wheel steering angle and the rear wheel steering angle are each formed between a parallel to the vehicle longitudinal axis and a radial plane which extends at right angles to the axis of rotation of the respective wheel. The radial plane is a plane which extends in the radial direction of the wheel. A general wheel steering angle is formed from the front wheel steering angle and the rear wheel steering angle.

In the method, the steering system 2 is checked for the presence of a fault state. If a fault, for example a failure of the steering actuator, is detected, the emergency steering operation is initiated in order to reproduce or maintain the original vehicle behaviour. In practical terms, in the exemplary embodiment according to FIG. 1, this means that the left-hand curve predefined by the steering lock will be traversed at the desired speed as though the steering system 2 were operating normally.

In the emergency steering operation, the steering wheel position and the vehicle speed are measured and a target lateral acceleration is determined therefrom. In addition, the current steering wheel position and the current vehicle speed are used to calculate the yaw moment, from which in turn a general wheel steering angle δg, which corresponds to the original vehicle behaviour, is derived. For the general wheel steering angle δg $$\delta g = \delta f - \delta r$$

δg—general wheel steering angle
δf—front wheel steering angle
δr—rear wheel steering angle The general wheel steering angle δg is therefore divided up into the front wheel steering angle δf and the rear wheel steering angle δr. The front/rear ratio division can be changed somewhat, provided that the general wheel steering angle δg is maintained.

For the front wheel steering angle δf and the rear wheel steering angle or, the corresponding correction values, i.e.
  front wheel steering angle correction Δδf and
  rear wheel steering angle correction Δδr
are determined. In addition, the corresponding yaw moment components for the front wheels FL, FR and the rear wheels RL, RR are determined from the yaw moment and, from these, the corresponding drive and/or braking torques which are applied individually to the front wheels FL, FR and the rear wheels RL, RR by the torque vectoring system. If, therefore, the steering actuator fails, the first steering rod 3 can move freely. This is likewise true of the second steering rod 4, since this is not driven. By means of the distributed drive torques and/or braking torques, the two steering rods 3, 4 are moved into the desired position, so that the vehicle carries out the required yaw moment response and slip angle response. This is illustrated by using FIG. 1 by the fact that the right-hand front wheel FR experiences a drive torque (arrow towards the front) and the left-hand front wheel FL experiences a braking torque (arrow towards the rear). As a result, a front yaw moment component is generated and the two front wheels FL, FR are steered to the left. The right-hand rear wheel RR experiences a braking torque (arrow towards the rear), so that a rear yaw moment component is generated and the second steering rod 4 is likewise deflected to the right. The vehicle describes a left-hand curve along that of the original path course.

In a right-hand curve, the torque distribution is reversed.

Figure 2:
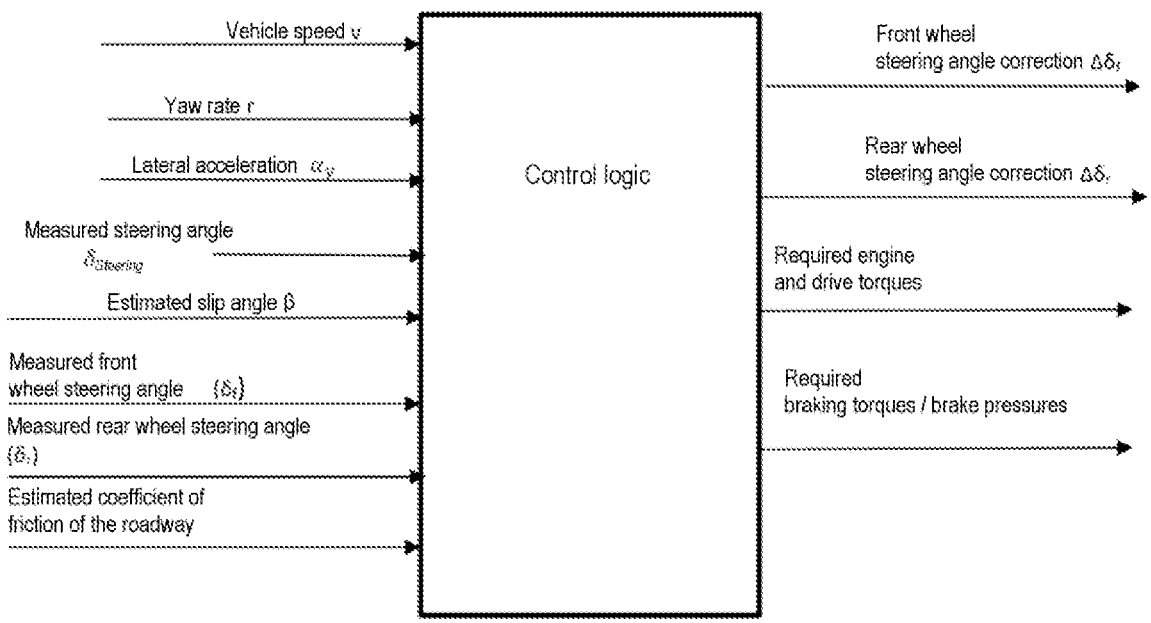
FIG. 2 shows a block diagram of the control of the method explained with reference to FIG. 1.

FIG. 2 shows a block diagram with the control logic for the method according to FIG. 1. The vehicle speed, the yaw rate and the lateral acceleration are accordingly input into the controller as input variables. Further input variables are the measured steering angle, the estimated slip angle β of the vehicle, the measured front wheel steering angle, the measured rear wheel steering angle and the estimated coefficient of friction of the roadway. The output variables are the front wheel steering angle correction Δδf and the rear wheel steering angle correction Δδr, as well as the required engine torques and drive torques and braking torques or brake pressures.

LIST OF REFERENCE SYMBOLS

| List of reference symbols | |
|---|---|
| 1 | Motor vehicle |
| 2 | Steering system |
| 3 | First steering rod |
| 4 | Second steering rod |
| 5, 6 | Individual wheel brakes |
| 7 | Drive |
| 10 | Front axle |
| 20 | Rear axle |
| FL | Left-hand front wheel |

-continued

List of reference symbols

| FR | Right-hand front wheel |
| RL | Left-hand rear wheel |
| RR | Right-hand rear wheel |

What is claimed is:

1. A method for controlling a steer-by-wire steering system for a motor vehicle in emergency steering operation, wherein the motor vehicle comprises a front axle with front wheels, a rear axle with rear wheels, a steer-by-wire steering system, and a torque vectoring system, wherein the front wheels and the rear wheels are each connected by a steering rod and are steerable, the method comprising:

checking the steering system for the presence of a fault state, performing the emergency steering operation to maintain original driving behavior if a fault state is detected, including: determining a target lateral acceleration on the basis of a current steering wheel position and a current vehicle speed, determining a yaw moment and, from the yaw moment, a general wheel steering angle for the original driving behavior, wherein the general wheel steering angle equals a difference between a front wheel steering angle and a rear wheel steering angle, determining a front wheel steering angle correction and a rear wheel steering angle correction, and determining drive torques and/or braking torques for the front wheels and the rear wheels, which are distributed appropriately by the torque vectoring system.

2. The method according to claim 1, further comprising determining a target slip angle as a target variable for the front wheel steering angle and the rear wheel steering angle.

3. The method according to claim 1, further comprising determining yaw moment components from the yaw moment for the drive torques and/or braking torques for the front wheels and the rear wheels, which are distributed appropriately by the torque vectoring system.

4. The method according to claim 1, further comprising determining the yaw moment on the basis of the current steering wheel position and the current vehicle speed.

5. The method according to claim 1, wherein the steer-by-wire steering system comprises front wheel steering.

6. The method according to claim 1, wherein the motor vehicle has individual wheel brakes.

7. The method according to claim 1, wherein the motor vehicle has a drive, which is arranged on the front axle and has an open differential gear mechanism.

8. A control device for controlling a steer-by-wire steering system for a motor vehicle in emergency steering operation, wherein the motor vehicle comprises a front axle with front wheels, a rear axle with rear wheels, a steer-by-wire steering system, and a torque vectoring system, wherein the front wheels and the rear wheels are each connected by a steering rod and are steerable, wherein the control device is configured to perform a method comprising:

checking the steering system for the presence of a fault state, performing the emergency steering operation to maintain original driving behavior if a fault state is detected, including: determining a target lateral acceleration on the basis of a current steering wheel position and a current vehicle speed, determining a yaw moment and, from the yaw moment, a general wheel steering angle for the original driving behavior, wherein the general wheel steering angle equals a front wheel steering angle minus a rear wheel steering angle, determining a front wheel steering angle correction and a rear wheel steering angle correction, and determining drive torques and/or braking torques for the front wheels and the rear wheels, which are distributed appropriately by the torque vectoring system.

9. A motor vehicle having a control device according to claim 8.

* * * * *